May 21, 1940.   W. H. CHURCHILL   2,201,387
FASTENER INSTALLATION AND FASTENER FOR THE SAME
Filed Sept. 10, 1937

Inventor:
Wilmer H. Churchill.
by Walter S. Jones
Att'y.

Patented May 21, 1940

2,201,387

UNITED STATES PATENT OFFICE 2,201,387

FASTENER INSTALLATION AND FASTENER FOR THE SAME

Wilmer H. Churchill, Saugus, Mass., assignor to United-Carr Fastener Corporation, Cambridge, Mass., a corporation of Massachusetts Application September 10, 1937, Serial No. 163,217

4 Claims. (Cl. 189—88)

My invention aims to provide improvements in fastener secured installations and fasteners for the same.

In the drawing which illustrates a preferred embodiment of my invention:

Figure 1:
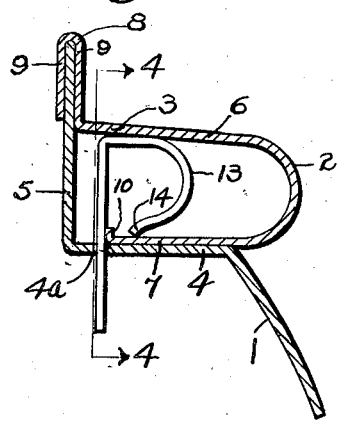
Figure 1 is a sectional view of an installation showing a preferred form of fastener member (in elevation) securing a trim strip to a supporting structure.
Figure 2:
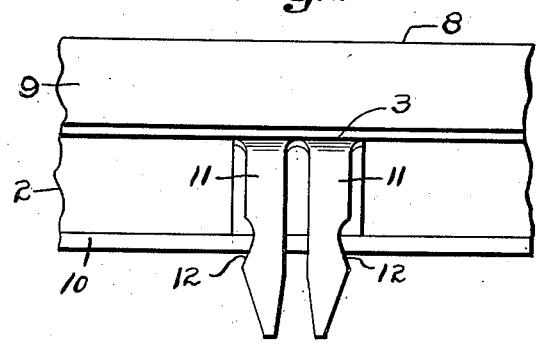
Fig. 2 is a front view showing my preferred fastener in engagement with a trim strip.

My invention, as illustrated in the accompanying drawing, relates particularly, though not exclusively, to an installation whereby trim strips and the like are secured to a supporting structure, such as an automobile body or similar structure, by an improved fastener member.

Referring to the drawing, I have shown a preferred installation comprising a supporting structure 1, which may be a particular portion of the metal body of an automobile door, and a hollow article of manufacture in the form of a trim strip 2 secured to the support 1 by the fastener 3. The trim strip 2 is of the type now commonly used on automobiles and elswhere for purposes of ornamentation, but it is to be understood that I do not wish to be limited by the particular trim strip illustrated and described because other articles of manufacture may be secured to a supporting part by means of my fastener member.

The supporting structure 1, which in my preferred installation represents the body of an automobile door, has a flat portion 4, against which a side wall of the strip 2 abuts (Fig. 1), and a right-angular bend portion 5 at the free end of the flat portion adapted for cooperative engagement with a portion of the strip 2 to provide a compact assembly between the parts of the installation. The flat portion 4 has an aperture 4ª of rectangular shape in my preferred form for receiving support-engaging portions of the fastener 3, as will be hereinafter more fully described.

The trim strip 2 is of the U-shaped cross-sectional type having a pair of oppositely disposed spaced side walls 6 and 7 in connected relation at their ends opposed to the open end of the U. A substantially hook-shaped support-engaging portion 8 is provided in my preferred form integral with the free end of the upper side wall 6. The support-engaging portion 8 includes a pair of spaced parallel arms 9—9 connected at one end of the portion 8 and lying in planes substantially perpendicular to the plane of the side wall 6. The arms 9—9 are adapted to receive a free end of the right-angular bend portion 5 of the support between them for lessening the chance of rattle-causing play between the parts. The lower side wall 7 has an upwardly extending lip portion 10 adjacent its free end which is adapted to contract a strip-engaging portion of the fastener 3 during entrance of the last-mentioned portion into the opening of the U of the strip, as will be described.

Figure 4:
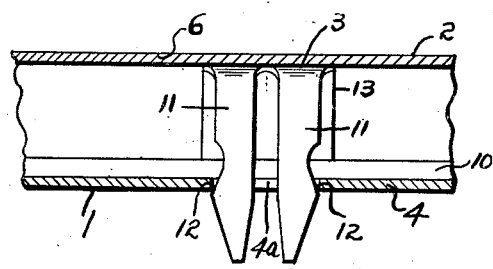
Fig. 4 is a section taken along the line 4—4 of Fig. 1.
Figure 5:
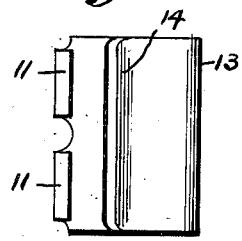
Fig. 5 is a bottom view of my preferred fastener per se.
Figure 6:
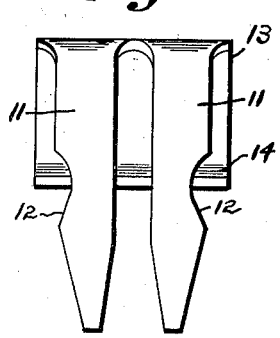
Fig. 6 is a front view of the fastener member shown in Fig. 5.
Figure 7:
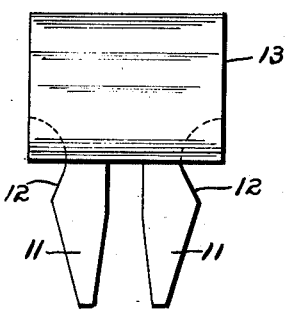
Fig. 7 is a rear view of the fastener shown in Fig. 5.

Referring in detail to my preferred fastener member 3, I have provided a one-piece spring fastener having a pair of yieldable legs 11—11 lying in substantially the same plane and adapted to move toward and away from each other edgewisely. Each of the legs 11—11 has a notch on its outer edge providing a shoulder 12 adapted to engage material of the flat portion 4 of the support 1 adjacent the aperture 4ª when the legs have passed through the aperture (Fig. 4). The outer edges of the yieldable legs 11—11 preferably converge toward their free ends from the shoulders 12 thereby providing camming means for forcing the legs toward each other during passage of the same through the aperture, as will be understood by those skilled in the art. As a means for securing the fastener 3 to the strip 2 I have provided an attaching portion in the form of a U-shaped yieldable portion 13 having one end integral with the ends of the legs 11—11 opposed to their leading ends and, in my preferred form, disposed entirely on one side of the plane of the legs 11—11. The free end 14 of the U-shaped portion 13 is preferably spaced from the legs 11—11 and yieldable back and forth relative to material of the portion 13 integral with the legs 11—11 whereby the portion 13 may be sprung into engagement with the side walls 6 and 7 of the trim strip 2.

Figure 3:
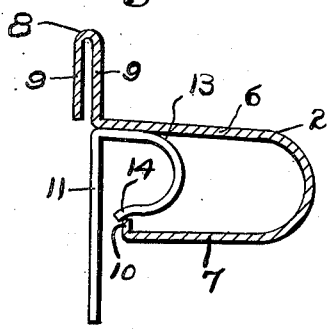
Fig. 3 is a side sectional view showing the manner in which a fastener (in elevation) is assembled with the trim strip.

Assembly of the parts of my installation is carried out quickly and easily through moving the U-shaped portion 13 of the fastener 3 toward the opening provided by the U-shaped portion of the strip 2 so that the lip 10 of the lower wall 7 engages material adjacent the free end 14 of the portion 13, as most clearly shown in Fig. 3. As movement of the portion 13 through the opening of the strip 2 is continued, the lip 10 contracts the portion 13 until the free end 14 has passed over the lip, at which time the free end expands to engage the lower wall 7 of the strip so as to secure the fastener to the strip. It will be noticed that when the fastener is in final assembly with the strip in my preferred installation, surfaces of the legs 11—11 on the side upon which the end 14 is disposed lie adjacent the outer surface of the lip 10 (Fig. 1). Finally, the strip 2 having the fastener member assembled therewith is secured to the support 1 through moving the strip toward the support and positioning it with the support-engaging portion 8 disposed over the free end of the right-angular bend portion 5 so that the spaced arms 9—9 engage opposed surfaces of the right-angular bend portion 5 and the legs 11—11 of the fastener member extend into the aperture 4a of the flat portion 4. Then force is exerted on the strip 2 to move the legs of the fastener member through the aperture 4a until the shoulders 12 have passed through the aperture, at which time the legs expand to engage the shoulders behind the outer surface of the flat portion 4, as most clearly shown in Fig. 4. It will be noticed that the direction of the movement of the legs through the aperture 4a for engaging the shoulders 12 with the support is substantially transverse to the direction of the movement of the U-shaped attaching portion 13 into the opening of the U-shaped body of the strip for securing the fastener to the strip. When the legs 11—11 are in fastened engagement with the support, that portion of the support-engaging portion 8 of the strip 2 connecting the arms 9—9 is in abutting relation to the free end of the right-angular bend 5 and the arms 9—9 embrace opposite sides of the right-angular bend to prevent any chance of play between the parts of the device.

Thus by my invention I have provided a fastener member of simple and inexpensive construction adapted for use with articles of manufacture such as trim strips and the like parts for securing the article to a support in an easy yet efficient manner.

Although I have illustrated and described a preferred embodiment of my invention, I do not wish to be limited thereby because the scope of my invention is best set forth in the following claims.

I claim:

1. A fastener member including a pair of yieldable portions having shoulders on their outer edges to make snap fastener engagement with a supporting part when said portions are moved toward each other edgewisely and a yieldable stud means disposed on one side and between the ends of said yieldable portion and adapted to cooperate with a socket means provided by an article to be carried by said supporting part whereby said article is secured to said supporting part by a snap fastener action.

2. A fastener installation including an apertured support, a hollow molding having an elongated fastener-receiving opening on one side and a fastener member for securing said molding to said support, said fastener member having yieldable portions extending substantially in the plane of the longitudinal and transverse axes of said opening in said molding and in a direction normal to the longitudinal axis of said opening, said yieldable portions projecting through an aperture of said support located adjacent to an edge of the fastener-receiving opening in said molding and engaging material of the support adjacent said aperture and a yieldable stud portion extending into the fastener-receiving opening of said molding and spacing said fastener-receiving opening.

3. A fastener installation including an apertured support, a strip of substantially U-shaped cross-section having opposed spaced side walls, one of said side walls being disposed adjacent said support and a fastener member for securing said strip to said support, said fastener member having yieldable members extending across the open end of said strip and through an aperture in said support and engaging material adjacent the same, and a flexible stud portion disposed entirely on one side of said yieldable members and flexible independently thereof, said stud portion being disposed between and engaging both said side walls of said strip whereby said strip is secured to said support.

4. A fastener installation including an apertured support, a strip of substantially U-shaped cross-section having opposed spaced side walls and an opening between said side walls, one of said side walls being disposed adjacent said support and having an upstanding lip portion adjacent its open end and a fastener member for securing said strip to said support, said fastener member having yieldable portions adapted to extend through an aperture of said support and engaging material adjacent the same and a U-shaped flexible portion disposed on one side of said yieldable portions, said last-mentioned U-shaped portion being contracted by said lip portion during movement through said opening and said U-shaped portion expanding after passage through said opening to engage said side walls.

WILMER H. CHURCHILL.